UNITED STATES PATENT OFFICE.

GUSTAVE HENRY DUBELLE, OF NEW YORK, ASSIGNOR TO GUSTAV A. EDLER, OF WOODSIDE, NEW YORK.

SOLIDIFIED PERFUME.

SPECIFICATION forming part of Letters Patent No. 433,455, dated August 5, 1890.

Application filed October 28, 1889. Serial No. 328,481. (No specimens.)

*To all whom it may concern:*

Be it known that I, GUSTAVE HENRY DUBELLE, a citizen of the United States, residing at New York, county and State of New York, have invented certain new and useful Improvements in Solidified Perfumes and Processes for Making the Same, of which the following is such a full, clear, and exact description as will enable any one skilled in the art to which it appertains to make and use the same.

My invention relates to solidified perfumes and a process of making the same.

I have discovered that a wax-like material—for instance, paraffine—when incorporated or mixed with a basal substance, such as orris-root, preferably the Florentine orris-root, (*I. Florentina,*) combined with odors or extract of flowers, essential oils, or other materials used in perfumery, possesses peculiar qualities which render it particularly well adapted for making solidified perfumes or perfume-cones and the like.

In order that my invention may be fully understood, I will proceed to describe the same, setting forth specifically how it may be carried into effect, and then pointing out what I claim as my invention.

In carrying out my invention I preferably use for the waxy protecting material paraffine, which is well known as a colorless odorless wax-like material that does not melt at ordinary temperature. The paraffine is first reduced to liquid form by heating the same by means of a water bath or otherwise, in order to more readily mix with it the powdered orris-root and the perfume, which may then be added. I find that a most desirable result may be obtained by using approximately the following proportions—namely, seventy-five (75) per cent. of wax-like material or paraffine, ten (10) per cent. of orris-root, preferably the powdered Florentine orris-root, and fifteen (15) per cent. of perfuming substances—such, for instance, as extracts or odors of flowers, or essential oils. This liquid mixture is then allowed to cool, when it solidifies and is ready for use.

By the expression "basal substance," as employed in the specification and claims, I mean a substance—such as orris-root—designed and adapted to take up and hold mechanically the odors or extract of, for instance, flowers, and which may be incorporated with the mastic protecting material. I have used the word "perfume" in its technical meaning, and therefore orris-root is not considered as coming within the meaning of this term. By my process I am enabled to produce a solid body of a homogeneous nature wherein the perfume is uniformly distributed, and wherein said perfume is protected against excessive dissipation by means of the wax-like protecting material. Thus a volatile perfume—such as one of the essential oils—may be so incorporated in the solid body or protecting material as to be practically permanently retained thereby.

If desired, the solidified perfume may be made into cones, sticks, or balls, or any preferred shapes.

It is to be understood that my invention is not limited to the employment of paraffine as the protecting material, such substance having been given as a type, but that the invention embraces any suitable or wax-like material with which the basal substance or orris-root and the perfuming substance may be incorporated. It is to be further understood that the perfuming substances added with the basal substance or orris-root include any suitable perfuming material—such, for instance, as odors of flowers or essential oils.

Having thus described my improvements in solid perfumes and the process of making the same, what I claim as my invention, and desire to secure by Letters Patent, is—

1. A solidified perfuming agent consisting of a waxy protecting material intimately admixed with orris-root impregnated with a perfume, substantially as and for the purpose described.

2. A solidified perfuming agent consisting of paraffine intimately admixed with pulverized orris-root impregnated with a perfume, substantially as and for the purpose described.

3. A solidified perfume consisting of paraffine intimately admixed with powdered orris-root and a volatile perfume, substantially as and for the purpose set forth.

In testimony whereof I have hereunto set my hand and seal, this 26th day of October, 1889, in the presence of two subscribing witnesses.

GUSTAVE HENRY DUBELLE. [L. S.]

Witnesses:
G. A. EDLER,
CHAS. D. FOWLER.